United States Patent
Ljung et al.

(10) Patent No.: US 11,985,504 B2
(45) Date of Patent: May 14, 2024

(54) METHODS AND NETWORK DEVICES FOR REPORTING NETWORK DYSFUNCTION IN A WIRELESS COMMUNICATION NETWORK

(71) Applicant: SONY CORPORATION, Tokyo (JP)

(72) Inventors: Rickard Ljung, Helsingborg (SE); Anders Mellqvist, Malmö (SE); Daniel Lönnblad, Genarp (SE)

(73) Assignee: Sony Group Corporation, Tokyo (JP)

( * ) Notice: Subject to any disclaimer, the term of this patent is extended or adjusted under 35 U.S.C. 154(b) by 830 days.

(21) Appl. No.: 17/041,805

(22) PCT Filed: Jan. 10, 2019

(86) PCT No.: PCT/SE2019/050013
§ 371 (c)(1),
(2) Date: Sep. 25, 2020

(87) PCT Pub. No.: WO2019/203707
PCT Pub. Date: Oct. 24, 2019

(65) Prior Publication Data
US 2021/0014690 A1    Jan. 14, 2021

(30) Foreign Application Priority Data

Apr. 17, 2018  (SE) .................... 1850433-2

(51) Int. Cl.
*H04W 12/122* (2021.01)
*H04K 3/00* (2006.01)
*H04W 24/08* (2009.01)

(52) U.S. Cl.
CPC .......... *H04W 12/122* (2021.01); *H04K 3/226* (2013.01); *H04K 3/65* (2013.01);
(Continued)

(58) Field of Classification Search
None
See application file for complete search history.

(56) References Cited

U.S. PATENT DOCUMENTS 8,213,319 B2 * 7/2012 Spott ............... H04L 43/065
 370/242
10,129,902 B2 * 11/2018 Kaur ............... H04W 76/19
(Continued)

FOREIGN PATENT DOCUMENTS

CN       105940748 A       9/2016
EP       2137905 A1 * 12/2009   ......... H04L 12/2422
(Continued)

OTHER PUBLICATIONS

Swedish Search Report from corresponding Swedish Application No. 1850433-2, dated Nov. 11, 2018, 3 pages.
(Continued)

*Primary Examiner* — Beemnet W Dada
*Assistant Examiner* — Hassan Saadoun
(74) *Attorney, Agent, or Firm* — Tucker Ellis LLP

(57) ABSTRACT

The present disclosure relates to the area of telecommunication, and in particular to methods for reporting network dysfunction in a wireless communication network (1). According to a first aspect of embodiments herein it is provided a method, for use in a wireless communication device (10), for reporting network dysfunction. The method comprises obtaining information defining radio communication properties (e.g. use of a relaying wireless communication device (30)) for use when reporting network dysfunction in a wireless communication network (1). The method further comprises detecting network dysfunction, and sending a report indicating the detected network dysfunction e.g. to a radio network node 20 using the obtained radio communication properties. The disclosure also relates to a corresponding radio network node (20) and wireless commu-
(Continued)

nication devices (10), (30) and to a computer program for implementing the proposed method.

17 Claims, 11 Drawing Sheets

(52) U.S. Cl.
CPC ........ *H04W 24/08* (2013.01); *H04K 2203/16* (2013.01); *H04K 2203/18* (2013.01)

(56) References Cited

U.S. PATENT DOCUMENTS

| 10,623,131 | B2* | 4/2020 | Breuer | .................. H04K 3/226 |
| 2008/0070510 | A1 | 3/2008 | Doppler et al. | |
| 2008/0117004 | A1 | 10/2008 | Mochizuki | |
| 2010/0317363 | A1 | 12/2010 | Bai | |
| 2011/0151827 | A1 | 6/2011 | Snider | |
| 2014/0349568 | A1 | 11/2014 | Niemela | |
| 2015/0271675 | A1 | 9/2015 | Cheng | |
| 2016/0044525 | A1* | 2/2016 | Alnashi | ................... H04W 4/80 455/418 |
| 2016/0044529 | A1* | 2/2016 | Pinheiro | .......... H04W 28/0247 370/237 |
| 2016/0227463 | A1 | 8/2016 | Baligh | |
| 2017/0013655 | A1 | 1/2017 | Martin | |

FOREIGN PATENT DOCUMENTS

| EP | 3166244 A1 * | 5/2017 | ............. H04K 3/226 |
| EP | 3166244 A1 | 5/2017 | |
| GB | 2435987 A | 9/2007 | |
| WO | 2012121634 A1 | 9/2012 | |
| WO | 2015143170 A1 | 9/2015 | |
| WO | WO-2015143170 A1 * | 9/2015 | .......... H04W 52/383 |
| WO | 2018029648 A1 | 2/2018 | |

OTHER PUBLICATIONS

International Search Report and Written Opinion from corresponding International Application No. PCT/SE2019/050013, dated May 6, 2019, 12 pages.

* cited by examiner

METHODS AND NETWORK DEVICES FOR REPORTING NETWORK DYSFUNCTION IN A WIRELESS COMMUNICATION NETWORK

RELATED APPLICATION DATA

This application is a national phase entry of International Patent Application No. PCT/SE2019/050013, filed Jan. 10, 2019, which claims the benefit of Swedish Patent Application No. 1850433-2, filed Apr. 17, 2018, the disclosures of which are incorporated herein by reference in their entireties.

TECHNICAL FIELD

The present disclosure relates to the area of telecommunication, and in particular to methods for reporting network dysfunction in a wireless communication network. The disclosure also relates to a corresponding radio network node and wireless communication devices and to a computer program for implementing the proposed method.

BACKGROUND

The 3rd Generation Partnership Project, 3GPP, is responsible for the standardization of the Universal Mobile Telecommunication System, UMTS, and Long Term Evolution, LTE. The 3GPP work on LTE is also referred to as Evolved Universal Terrestrial Access Network, E-UTRAN. LTE is a technology for realizing high-speed packet-based communication that can reach high data rates both in the downlink and in the uplink and is thought of as a next generation mobile communication system relative to UMTS. In order to support high data rates, LTE allows for a system bandwidth of 20 MHz, or up to 100 MHz when carrier aggregation is employed. LTE is also able to operate in different frequency bands and can operate in at least Frequency Division Duplex, FDD, and Time Division Duplex, TDD, modes. 3GPP is also responsible for standardization of the New Radio (NR), also referred to as a 5G radio technology. In NR the system bandwidth is flexible and similar to LTE it can operate in both FDD and TDD.

In an E-UTRAN, a User Equipment, UE, or a wireless communication device is wirelessly connected to a Radio Base Station, RBS, commonly referred to as a NodeB, in UMTS, and as an evolved NodeB, eNodeB or eNB, in LTE. In NR a base station may also be referred to as gNB. A Radio Base Station, RBS, or an access point, or a transmission and reception point (TRP) is a general term for a radio network node capable of transmitting radio signals to a wireless communication device and receiving signals transmitted by a wireless communication device.

Secure and reliable communication is an important part of modern telecommunication infrastructure. However, as for many other types of communication networks there may also be people and organizations that intentionally or un-intentionally disturb the communication within the networks. The purpose of such disturbance may differ but may for example be to limit communication possibilities (e.g. denial of service attacks) or to monitor or extract information about the communication devices (e.g. tracking the location and/or identity of devices or the users of the devices). Typically, this may be done locally, and one or more UEs may thus be affected without the operator having any possibility to easily detect it.

Furthermore, with the further extensions of the 3GPP technologies in the direction of for example industrial Internet of Things, IoT, and Vehicle-to-Vehicle, V2V/Vehicle-to-Anything communications, there will in the future be an even broader range of infrastructure and other essential systems that are connected via the 3GPP systems. With the increased use and dependency on mobile communication the risk of significant impact from miss-behavior will also increase.

Thus, there are different type of suspicious behaviors from devices and network nodes as well as plausible network mal-function aspects that would be beneficial for the network operator and in turn possibly also law enforcement to be informed about, in order to be able to take required actions.

One example is so-called jamming. A jammer is a device that transmits signal that intentionally introduces interference into a communication channel. Today there are relatively simple solutions available to locally block wireless communication by means of e.g. jammers or other type of intentional transmissions aiming at locally disabling ordinary communication over certain parts of the wireless spectrum. Ordinary communication refers to e.g. to voice calls, data, and associated control signaling. The typical functionality of devices used to locally disable wireless communication is to transmit energy on a set of targeted frequencies, in order to block the possibility for ordinary downlink reception of signals for mobile devices within its proximity.

Another example is fake base stations. A commercially well-known example is the "stingray boxes", used for IMSI catching. But there are also other types of devices that can be locally put into a telecommunication network in order to collect information or in other means tamper with the network.

A UE that detects e.g. a jamming situation or a base station which doesn't appear to work in a normal manner should ideally be able to collect information and report this to the 3GPP operator network.

For example, US patent application US2014/0349568 A1 proposes detecting, in response to an acquiring the message, presence of an intentional radio interference source and upon a result of said detection of the intentional radio interference source, causing transmission of a notification message to a determined target entity.

However, in the future there will be a need for improved ways for the mobile networks to detect misbehaving devices in the networks.

SUMMARY

An object of embodiments herein is to alleviate at least some of the above-mentioned problems related to network dysfunction. It is an object of this disclosure to allow a network to be immediately informed of specific network communication failure situations impacting a wireless communication device such as high interference, even if the wireless communication device ends up in an out of coverage situation. Thus, it is a further object to provide a wireless communication device that detects network dysfunction, such as a jammer or network failure, with alternative ways to report the dysfunction to the network, which differ from normal operation.

According to a first aspect of embodiments herein it is provided a method, for use in a wireless communication device, for reporting network dysfunction. The method comprises obtaining information defining radio communication properties for use when reporting network dysfunction in a wireless communication network. The method further comprises detecting network dysfunction, and sending a report indicating the detected network dysfunction using the obtained radio communication properties. By using an alternative way of accessing the wireless communication network, the network dysfunction may be reported even when the wireless communication device cannot access the network. Thereby, other means of abuse reporting, followed by the need to locate and measure the interference by hand is not needed. Compared to today this new proposed method provides a standardized solution to report unexpected spectrum interference.

According to some embodiments, the radio communication properties for use when reporting network dysfunction are different from the properties used for regular communication in the wireless communication network. Thereby, the chance that the network dysfunction will also affect the reporting is lower.

According to some embodiments, the radio communication properties for use when reporting network dysfunction comprises at least one of; transmission power, radio resources, Radio Access Technology, RAT, communication protocol, cell identity, tracking area code, ciphering methodology, communication timing and use of direct communication with a further wireless communication device.

According to some embodiments, the obtaining comprises obtaining information about radio resources allocated for reporting network dysfunction and wherein the sending comprises broadcasting the report on the allocated radio resources. Thereby, the report may be sent even without proper network access, as the broadcasting does not require e.g. synchronization. If the resource allocation is signaled by the wireless communication devices, then only registered wireless communication device in the network is aware of the specific allocated resources for the transmission of the notification. Consequently, a blocking/jamming device that does not register to the network will not be able to know the network assigned resources.

According to some embodiments, the method further comprises establishing direct communication with a further wireless communication device (e.g. Device-to-Device, D2D, communication) and then the sending comprises sending the report using the established direct communication. By broadcasting the report to its neighbor wireless communication devices via a direct communication link, the wireless communication device can share information about the network dysfunction even without having capability to communicate with the network directly.

According to some embodiments, the network dysfunction comprises interference from jammers and/or fraudulent base stations. Thus, the wireless communication network may be informed about fraudulent devices and take proper measures.

According to a second aspect of embodiments herein it is provided a method, for use in a radio network node in a wireless communication network, for receiving network dysfunction reporting. The method comprises obtaining information defining radio communication properties for use when reporting network dysfunction in the wireless communication network, and receiving using the obtained radio communication properties, from a wireless communication device, a report indicating detected network dysfunction.

According to some embodiments, the radio communication properties for use when reporting network dysfunction are different from the properties used for regular communication in the wireless communication network.

According to some embodiments, the obtaining comprises obtaining information about radio resources allocated for reporting network dysfunction and the method further comprises monitoring the radio resources allocated for network dysfunction reporting.

According to some embodiments, the report is received from a wireless communication device different from the wireless communication device that detected the network dysfunction.

According to a third aspect of embodiments herein it is provided a method, for use in a first wireless communication device, for assisting a second wireless communication device in reporting network dysfunction in a wireless communication network. The method comprises obtaining information defining radio communication properties for use when reporting network dysfunction in the wireless communication network. The method further comprises receiving using the obtained radio communication properties, from the second wireless communication device, a report indicating detected network dysfunction and forwarding the report to a further node in the wireless communication network.

According to some embodiments, the obtaining comprises obtaining information about radio resources allocated for reporting network dysfunction and the method further comprises monitoring the radio resources allocated for network dysfunction reporting.

According to some embodiments the method further comprises establishing direct communication with the second wireless communication device, and the receiving comprises receiving the report using the established direct communication.

According to some embodiments the further node is a radio network node and/or a further wireless communication device.

According to a fourth aspect of embodiments herein it is provided a computer program comprising instructions which, when the program is executed by a computer, cause the computer to carry out the method according to any one of the preceding claims.

According to a fifth aspect of embodiments herein it is provided a computer-readable medium comprising instructions which, when executed by a computer, cause the computer to carry out the method described above and below.

According to a sixth aspect of embodiments herein it is provided a wireless communication device. The wireless communication device being configured to obtain information defining radio communication properties for use when reporting network dysfunction in a wireless communication network. The wireless communication device further being configured to detect network dysfunction, and to send a report indicating the detected network dysfunction to the wireless communication network using the obtained radio communication properties.

According to a seventh aspect of embodiments herein it is provided a radio network node in a wireless communication network. The a radio network node being configured to obtain information defining radio communication properties for use when reporting network dysfunction in the wireless communication network and to receive, using the obtained radio communication properties, from a wireless communication device, a report indicating detected network dysfunction.

According to an eighth aspect of embodiments herein it is provided a first wireless communication device for assisting a second wireless communication device in reporting network dysfunction in a wireless communication network. The first wireless communication device being configured to obtain information defining radio communication properties for use when reporting network dysfunction in the wireless communication network. The first wireless communication device further being configured to receive using the obtained radio communication properties, from the second wireless communication device, a report indicating detected network dysfunction and to forward the report to a further node in the wireless communication network.

DETAILED DESCRIPTION

A wireless communication device that detects e.g. a jamming situation or a base station which doesn't appear to work in a normal manner should ideally be able to collect information about the dysfunction and report this to the 3GPP operator network. However, depending on the characteristics of the network dysfunction, the affected wireless communication devices cannot always report directly to the wireless communication network, since the wireless communication device may not be able to operate normally due to the network dysfunction e.g. high interference level. In addition, if the wireless communication device is currently experiencing a network dysfunction it may not be preferred to send the report over the same communication network since it then may send it over the affected communication system (e.g. to a fake base station or similar).

Figure 1:
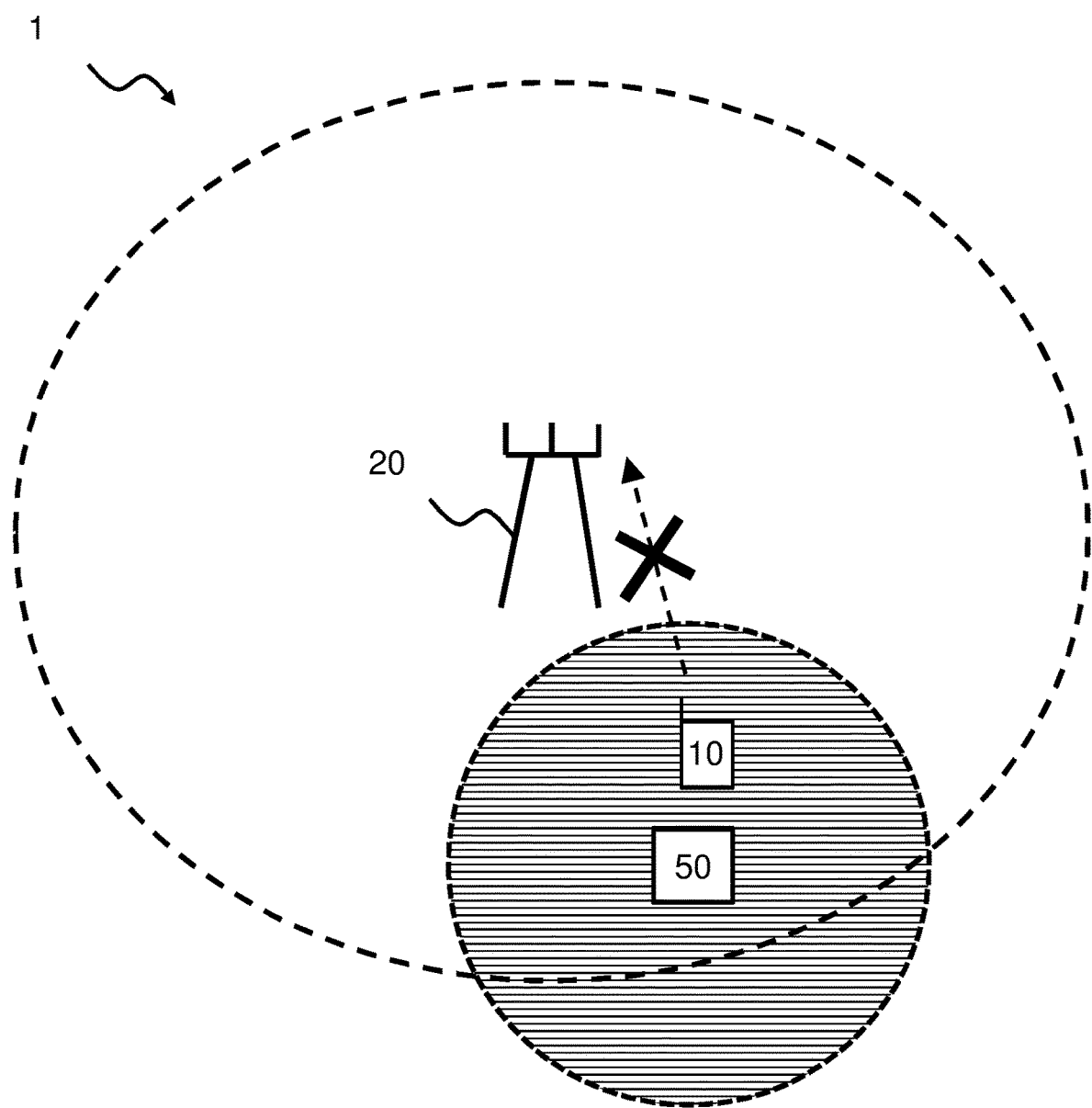
FIG. 1 illustrates a wireless communication network comprising a wireless communication device that attempts to report a jammer.

FIG. 1 illustrates a wireless communication network 1 comprising a wireless communication device 10 and a radio network node 20.

The term "radio network node" herein refers to any type of radio network node. For example, the radio network node 20 is a base station, such as a gNB or eNB. The base station may also be referred to as a NodeB, an evolved Node B (eNB, eNode B), a base transceiver station (BTS), Access Point (AP) Base Station, Wi-Fi AP, base station router, or any other network unit capable of communicating with wireless communications devices within a cell served by the base station depending e.g. on the radio access technology and terminology used. The radio network node 20 is connected to the core network of the wireless communication network 1 via the backhaul.

The term "wireless communication device" herein refers to any type of communication device capable of communicating with the radio network node 20, for e.g. a mobile terminal or a wireless terminal, a mobile phone, a computer such as e.g. a laptop, a Personal Digital Assistants (PDAs) or a tablet computer, with wireless capability, target device, device to device UE, MTC UE or UE capable of machine to machine communication, iPAD, mobile terminals, smart phone, Laptop Embedded Equipment (LEE), Laptop Mounted Equipment (LME), USB dongles etc. or any other radio network units capable to communicate over a radio link in a wireless communications network.

The wireless communication device 10 in FIG. 1 is exposed to interference caused by a jammer. The wireless communication device 10 attempts to report a jammer 50 that it has detected. However, due to interference caused by the jammer 50 the radio network node 20 cannot hear the report (which is indicated by the cross).

The proposed technique will now be illustrated in more detail by a number of exemplary embodiments. The following embodiments will be described referring to the example wireless communication network 1 of FIG. 1. However, it must be appreciated that the methods may be implemented in other networks as well.

It should be noted that these embodiments are not mutually exclusive. Components from one embodiment may be tacitly assumed to be present in another embodiment and it will be obvious to a person skilled in the art how those components may be used in the other exemplary embodiments.

The inventors have realized that the probability that the disturbed wireless communication device 10 can successfully send information is higher when using ways of communicating that differ from the normal operation. Therefore, it is herein proposed that wireless communication devices send information about unexpected interference using the alternative "way" than the "way" used for regular or ordinary communication in the network. For example, a wireless communication device 10 that detects a jammer or other unexpected network failure or suspicious network behavior and cannot reach the network or cannot reach a trusted network can use a pre-defined resource allocation link to inform neighbor wireless communication devices about the jammer characteristics and its own location. The resource allocation may be a given frequency for device-to-network communication or a direct communication.

Figure 2:
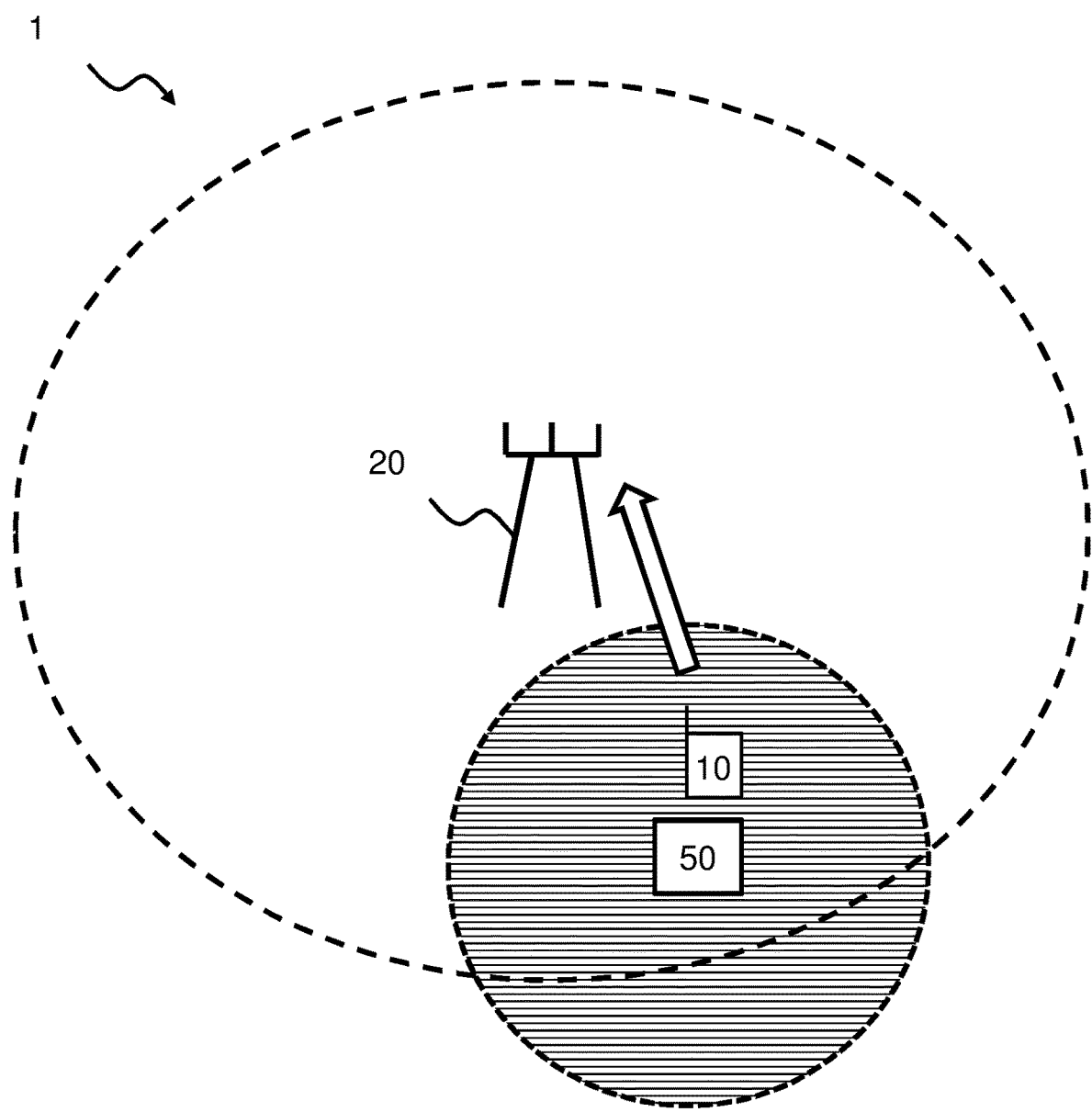
FIG. 2 illustrates reporting of the network dysfunction using radio resources dedicated to dysfunction reporting.

Thus, the jammed wireless communication device 10 may be instructed to use a specific pre-determined resource allocation for reporting network dysfunction. The reporting could possibly also use another more robust modulation and coding scheme, different error correcting encoding or higher power in order to increase the chance of being heard. FIG. 2 illustrates successful reporting of the network dysfunction using other radio resources (indicated by the white arrow) than for ordinary communication.

Figure 3:
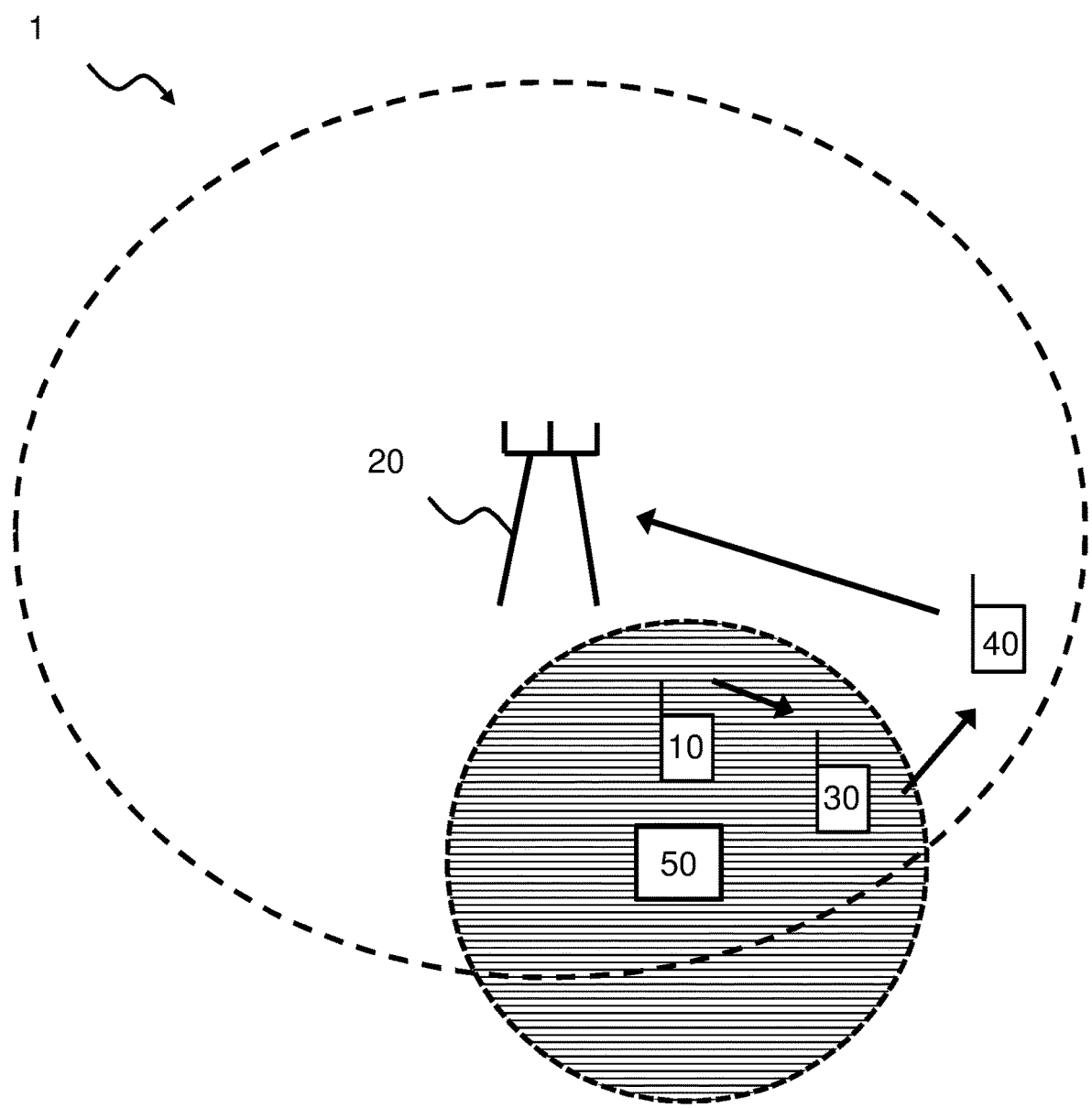
FIG. 3 illustrates reporting if the network dysfunction using side-link communication.

It is also possible that, even when the wireless communication device cannot be heard by the base station 20, it may still be heard by another wireless communication device 30 in its close proximity. Thus, as an alternative to a specific resource allocation, network dysfunction may be reported using direct communication via two relaying wireless communication devices 30, 40 as illustrated in FIG. 3. The further wireless communication device 40, which may not be affected by the jammer 50, may then report the jammer to the radio network node 20.

Direct communication herein refers to point to point communication between two wireless communication devices. Direct communication does typically not require network connection, although certain direct communication systems may include a coordination function by a node in the system. One example is LTE Direct, an autonomous long-distance D2D (Device to Device) protocol introduced in 3GPP Release 12 specification, which is also recognized as one of the technology components of the evolving 5G architecture. Other examples of direct communication include Wi-Fi direct and Bluetooth Ad Hoc network.

In some embodiments, the wireless communication device stores information about the network dysfunction and reports it as part of a radio link failure reporting function in 3GPP. In this way the probability that the wireless communication device will quickly alert the network about unexpected network failures e.g. due to jamming or other active communication limitation activities is increased.

The proposed solution could be of particular interest for the industrial IoT where wireless sensors are used to control a process, or other applications with high reliability requirements, where the time-to-report latency is critical for the system functionality. Example use cases could be when there is a need to quickly be able to stop a process or function or activate a certain trigger in a system when/if one or more wireless communication devices fail to communicate with the network.

The proposed technique may in some embodiments apply a 3GPP specific protocol for wireless communication devices to report network dysfunction. The channel to report this could e.g. be ProSe UE to UE, as defined in 3GPP Technical Specification, TS, 23.303, where direct communication and UE-to-Network Relay functionality is defined. The communication is done via broadcast, via a so-called side-link communication as defined in 3GPP TS 36.300. Specifically, in this 3GPP proximity service (ProSe) specifications a UE out of coverage can contact other UEs in order to achieve a relayed communication to the network. With such an implementation, the wireless communication devices could be certified to measure the interference (such as energy levels and bandwidth) with a certain proven accuracy, making it possible to control the level of accuracy of the interference measurements. Furthermore, the system could be collectively handled by e.g. all operators within a region or country, reducing the need to allocate resources for each operator.

The proposed methods for reporting network dysfunction will now be described with reference to FIG. 4-8. It should be appreciated that FIG. 4-8 comprise some operations which are illustrated with a solid border and some operations which are illustrated with a dashed border. The operations which are comprised in a solid border are operations which are comprised in the broader example embodiment. The operations which are comprised in a dashed border are example embodiments which may be comprised in, or a part of, or are further operations which may be taken in addition to the operations of the solid border example embodiments. It should be appreciated that the operations need not be performed in order. Furthermore, it should be appreciated that not all of the operations need to be performed. The example operations may be performed in any suitable order and in any combination.

Figure 4:
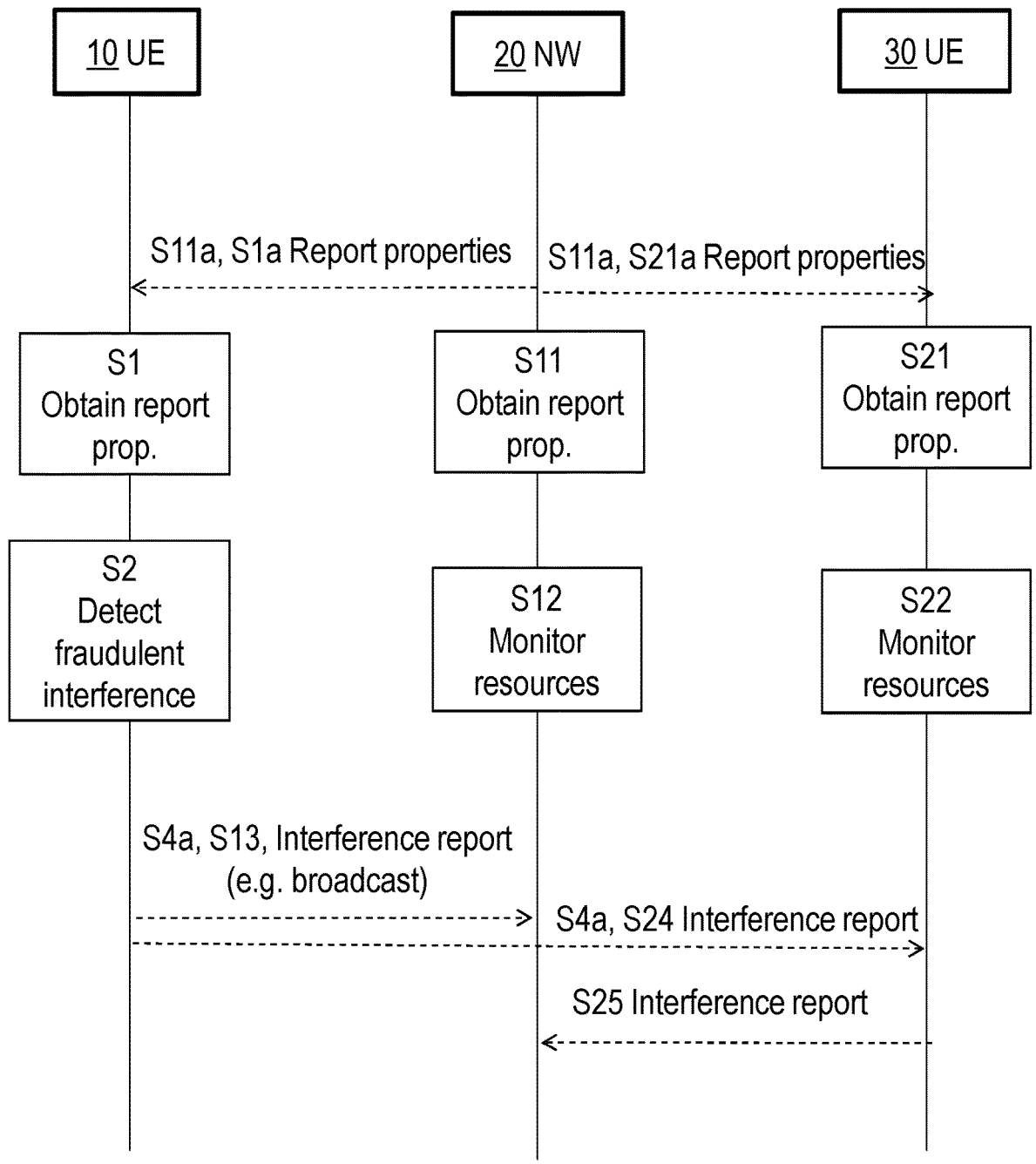
FIG. 4 illustrates signalling between a radio network node and wireless communication devices when reporting network dysfunction using radio resources dedicated to dysfunction reporting according to some example embodiments.

FIG. 4 illustrates signalling between the radio network node 20 and the wireless communication devices 10, 30 when reporting network dysfunction using radio resources dedicated to network dysfunction reporting according to some example embodiments. In this disclosure the term "node" will be used as a common term for any device in the wireless communication network 1 i.e. including both wireless communication devices and radio network nodes.

As a first step, the radio base station 20 and the wireless communication devices 10, 30 obtain S1, S11, S21 information about radio resources to use when reporting network dysfunction. The information may be predefined (e.g. standardized). Then the information may be stored in a memory of the respective nodes 10, 20, 30 and the obtaining implies reading the information e.g. from the memories.

Alternatively, the information about radio resources to use when reporting network dysfunction may be determined by the wireless network 1. For example, the base station 20 determines a resource allocation to use when reporting network dysfunction and sends S11a information to the wireless communication devices 10, 30 about which resources (e.g. where in frequency domain) the wireless communication devices may transmit reports about network dysfunction. The wireless communication devices 10, 30 receives S1a, S21a the reports. Consequently, all the nodes 10, 20, 30 will be aware of the resource allocation and will use it for reporting. The radio network node 20 (and possibly also the wireless communication devices 10, 30) will also monitor S12, S22 the resources to detect the reports.

When one of the wireless communication devices 10 detects S2 network dysfunction in the wireless communication network 1 it uses the obtained resource allocation when reporting S4a the network dysfunction. The radio network node 20 and/or the other wireless communication device 30 may then hear S13 the report and act accordingly. If another wireless communication device 30 hears the report it will forward S25 the report to the radio network node 20.

Figure 5:
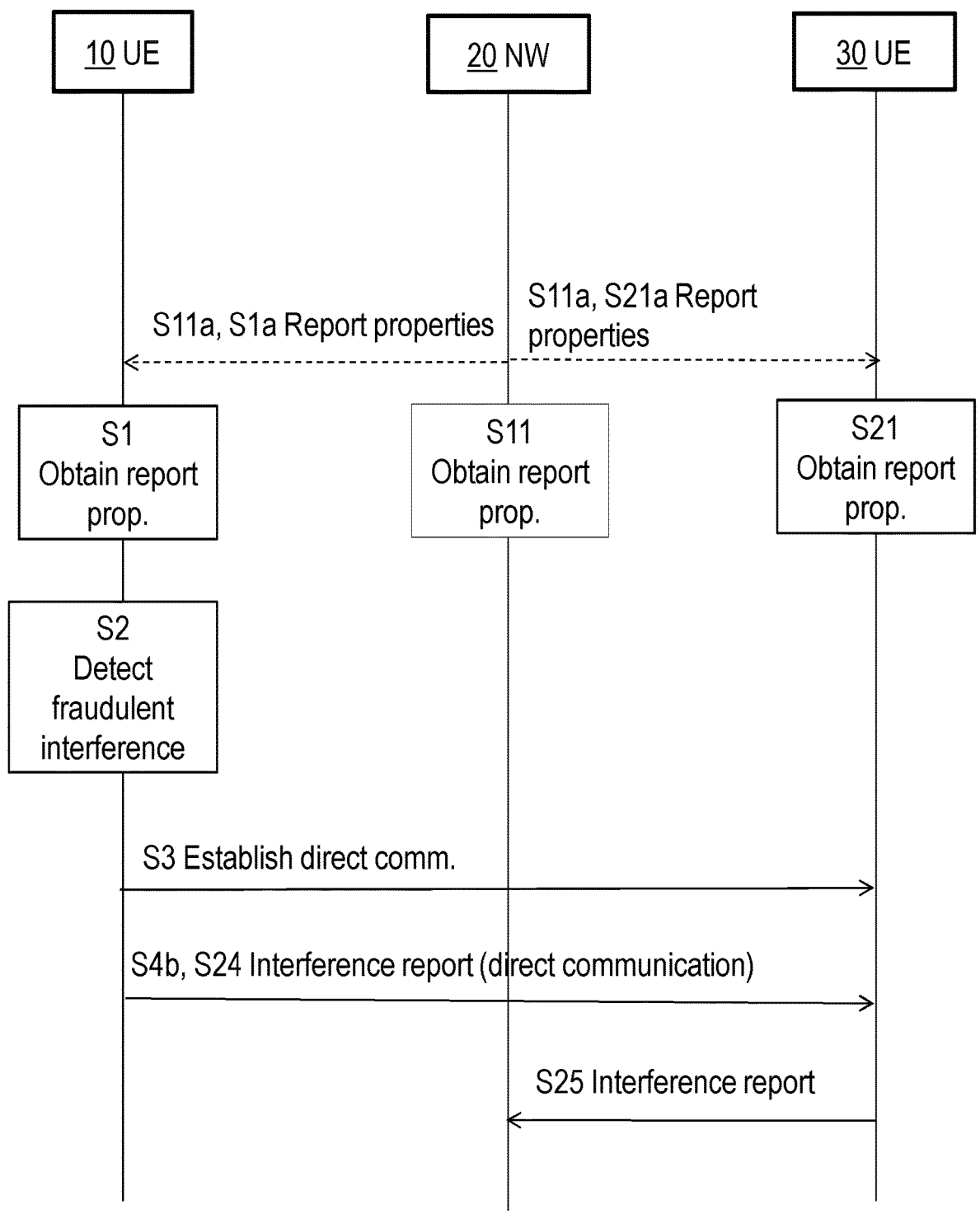
FIG. 5 illustrates signalling between a radio network node and wireless communication devices when reporting network dysfunction using side-link communication according to some example embodiments.

FIG. 5 illustrates signalling between the radio network node 20 and wireless communication devices 10, 30 when reporting network dysfunction using side-link communication according to some example embodiments. These embodiments differ from the embodiment in FIG. 4 in that side-link communication is used for the reporting. Thus, the obtained S1, S11, S21 properties indicate that side-link communication should be used. Hence, when one of the wireless communication devices 10 detects network dysfunction it will try to establish S3 direct communication with a further wireless communication device 30. The interference report will then be transmitted S4 (and received S24) over the established direct link, which will then forward S25 the report to the radio network node 20.

The proposed method, for use in a wireless communication device 10, for reporting network dysfunction will now be described with reference to FIG. 6. The network dysfunction comprises e.g. interference from jammers 50 and/or fraudulent base stations. The purpose is e.g. to report intentional disturbance, interference and other network attacks. However, in general, it is complicated for any wireless communication device to detect that a certain interference is intentional or that a certain network communication signalling is initiated with a non-legitimate purpose. Thus, in reality the wireless communication devices will look for high level of interference, or interference that causes service interruption or, or signalling messages that imposes the wireless device to expose device or user specific information in a suspicious manner or with a limited security level or similar. The wireless communication devices will not easily be able to detect why there is certain interference but can e.g. detect that the interference is so high that normal operation is not possible. Basically, network dysfunction is disturbance that is so severe that a wireless communication device has no possibility to understand why the network dysfunction is anything but intentional. Alternatively network dysfunction may consist of a network signalling behaviour that imposes security or information leakage threats. Examples of such identified signalling behaviour has been presented in [https://arxiv.org/pdf/1510.07563v2.pdf "Practical Attacks Against Privacy and Availability in 4G/LTE Mobile Communication Systems"]. It is to be understood that a network dysfunction may still be compliant to standardized signaling protocols, but the behavior may be known or suspected to impose a security or information leakage risk or similar. Thus "network dysfunction" should be understood as a general term for detected interference levels that are at such high levels and/or during so long periods of time as it significantly impacts the wireless communication device communication possibilities, or network signalling behaviour that may be considered as intentional misuse of the protocol, or signaling behavior that may be harmful for communication system security or information leakage and therefore needs to be reported.

Examples of such network dysfunction may therefore be but is not limited to a device detecting high interference levels, network node requesting a device to transmit a signal without proper security (e.g. without a certain level of ciphering), a device detecting that the tracking area code is changing unexpectedly or frequently, a device detecting that its temporary ID is not changed frequently, a device detecting paging message without following application level transmission (e.g. a VoLTE paging without network performing a following call setup procedure) or a network node transmitting unexpected reject message.

Figure 6:
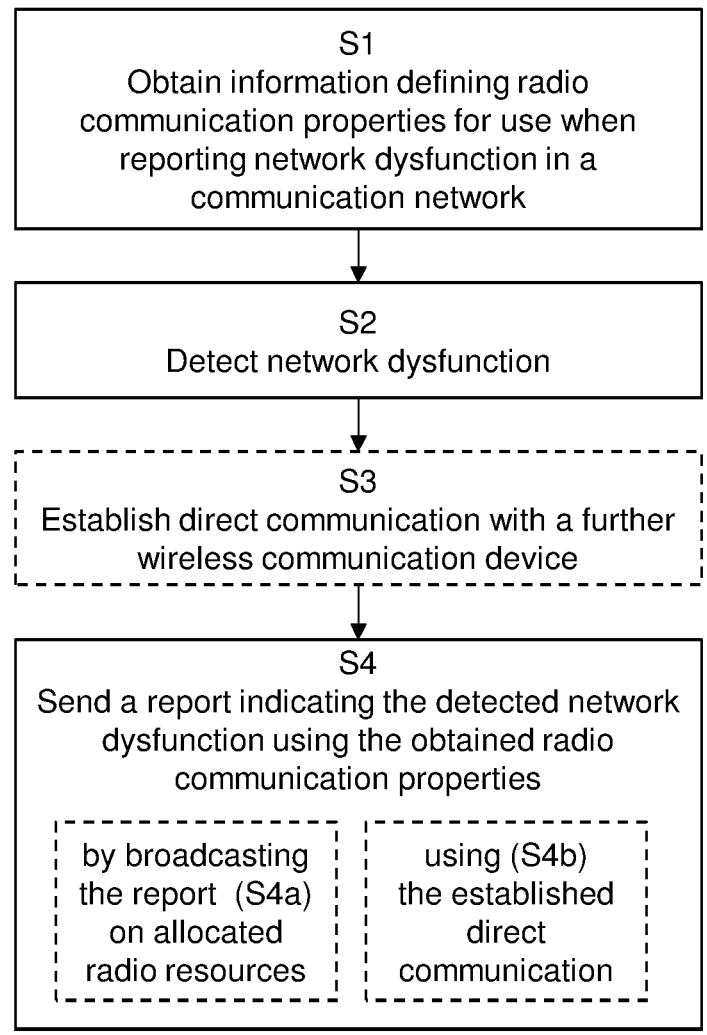
FIG. 6 is a flow chart illustrating example operations in a wireless communication device that exposed to network dysfunction.

The method of FIG. 6 is e.g. performed by a control arrangement 11 (FIG. 9) of the wireless communication device 10. The method may be implemented as a computer program comprising instructions which, when the program is executed by a computer (e.g. a processor in the control arrangement 11), cause the computer to carry out the method. According to some embodiments the computer program is stored in a computer-readable medium (e.g. a memory or a compact disc) that comprises instructions which, when executed by a computer, cause the computer to carry out the method.

The method comprises obtaining S1 information defining radio communication properties for use when reporting network dysfunction in a communication network 1. In other words, the wireless communication device 10 determines "how" to transmit notifications of unexpected interference that is assumed to be intentional misuse of the network. The radio communication properties for use when reporting network dysfunction are typically different from the properties used for regular (or ordinary) communication in the network 1, such that the interference may be reported even when the wireless communication device 10 cannot connect to the wireless network 1. Examples of radio communication properties (for use when reporting network dysfunction) that could be obtained S1 are transmission power, radio resources, Radio Access Technology, RAT, communication protocol, cell identity and tracking area code, ciphering methodology and use of direct communication with a further wireless communication device. The information may also specify what information elements should be included when reporting network dysfunction in the wireless communication network 1. In other words, the information may in addition to "how" to report define "what" to report. Examples of elements to be included in the report is wireless communication device identity, wireless communication device position, interference level, information identifying a potentially fraudulent base station, time when the dysfunction was detected, type of dysfunction, direction of interfering signal, etc.

For example, a radio network node 20 provides resource allocations to one or more wireless communication devices 10, 30 (here UEs) about how the one or more wireless communication devices shall transmit notifications of network dysfunction. In some embodiments, the radio network node 20 also provides information on what information elements such notification message should include. This information provided by the radio network node 20 could potentially be transmitted in a broadcasted fashion or in a dedicated signalling fashion. The information may be dependent on the so-called UE capabilities, i.e. the wireless communication network 1 may only provide resources on a frequency band which the UE has listed as a supported band. The provided frequency could be licensed, unlicensed or shared among several license holders. The information may determine a frequency resource and a preamble to transmit in a direct communication protocol such as the LTE D2D ProSe Broadcast function.

The wireless communication network 1 can at a later stage update the information by sending a new resource allocation message. In case jamming occurs at start up (prior to a successful network connection) the wireless communication device 10 could use a list of pre-stored Resource Allocation Messages according to information received during previous network connections. (This transmission could be done on licensed bands only if it has some means of establishing its location such as GPS first, but possible at all times on unlicensed bands). Such earlier received information could be valid for a certain time duration, e.g. a number of hours/days.

A wireless communication device which experiences one or more network failure parameters e.g. can use the preconfigured information to transmit a communication failure report. In other words, the method further comprises detecting S2 network dysfunction in the wireless communication network 1. Network dysfunction is e.g. unexpected spectrum interference or radio base stations that report erroneous information, wherein the dysfunction is so abnormal that it is assumed that it is an intentional attack or misuse of licensed spectrum, or other type of signaling behavior that may be harmful for communication system security or information leakage. Again, the network dysfunction should be understood as a general term for signal detection or network signalling behaviour that should be reported, as examples provided earlier. In other words, the trigger parameters to initiate the reporting could be, e.g. high interference level (typically due to a jammer) or an unexpected network connection reject (typically due to an IMSI catcher or malfunctioning radio network node) or other signaling that may impose a security or information threat. The proposal is to activate this specific signaling in the event of a jammer or network mal-function is detected.

In some embodiments, the method further comprises establishing S3 direct communication with a further wireless communication device 30. When side-link communication is used, the reporting may (as described above) be implemented as broadcasted information that is received by one or more wireless communication devices in the vicinity that listens to pre-determined resources. Alternatively, side-link communication may be established with one particular wireless communication device 30 and information may then be sent to that particular receiving wireless communication device 30.

The method further comprises sending S4 a report indicating the detected network dysfunction using the obtained radio communication properties. For example, when the wireless communication device 10 cannot reach the network to inform about detected network dysfunction, it will send information about the network dysfunction in a way that works without network connection, e.g. a direct link or on dedicated resources.

It can be noted that the wireless communication device 10 is not expected to be able to receive any control signaling or data during the time the spectrum is blocked. Hence the wireless communication device 10 may use the allocated frequency for the transmission of the notification without being able to synchronize its timing. The notification transmission may therefore start with a set of preamble bits, which allows a receiver to get synchronized with the transmitting wireless communication device 10.

In some embodiments, the obtaining S1 comprises obtaining information about radio resources allocated for reporting network dysfunction and wherein the sending S4 comprises broadcasting S4a the report on the allocated radio resources. Since the wireless communication device 10 may be out of coverage and may not be able to detect downlink signals e.g. for network synchronization, the wireless communication device has in some embodiments been instructed to use a certain pre-defined network radio resources.

In case of detection of high interference level, the report e.g. includes date and time, location, detected interference energy level, detected interference signal bandwidth and detected interference frequency range.

In case of detection of cells that provide erroneous information, the report comprises e.g. identities of cells which provide erroneous information or other malfunction. The report may also include date and time, location, frequency and bandwidth, the failure type.

If direct communication with a further wireless communication device 30 has been established, then the sending S4 comprises sending S4b the report using the established direct communication. Alternatively, the wireless communication device would be allowed to utilize the LTE D2D Proximity Services, ProSe, (First introduced in Release 12 of the 3GPP specifications) broadcast transmission, e.g. similar to the Prose discovery signal transmissions but in an unsynchronized manner. Such transmission is herein denoted "alert" transmission.

In some embodiments the wireless communication device 10 also reports other information about the unexpected interference. The other information is e.g. included in the report e.g. in the alert transmission. As mentioned above, the wireless communication network 1 may specify what information to report. Alternatively, the format of the report may be fixed (e.g. standardized).

Examples of other information are a preamble for local (i.e. using direct communication) sync and alert message detection and an alert cause (e.g. high interference level, network unexpected rejects/connection failures). The other information may also indicate how strong (e.g. in RSSI) detected interference is, the bandwidth of interference (e.g. in Hz) or (if the wireless communication device 10 has multiple antennas), what direction is the jammer is located. The wireless communication device may also report details of a malfunctioning radio network node 20 such as cell identity, ID, and type of reject message received. Furthermore, the wireless communication device 10 may report its latest updated position. It may also include an ID identifying the alert report.

If the report is relayed via several nodes the report may include ID(s) identifying the reporting and alert forwarding wireless communication devices and/or a hop counter, to be used for alert reporting forwarding.

Figure 7:
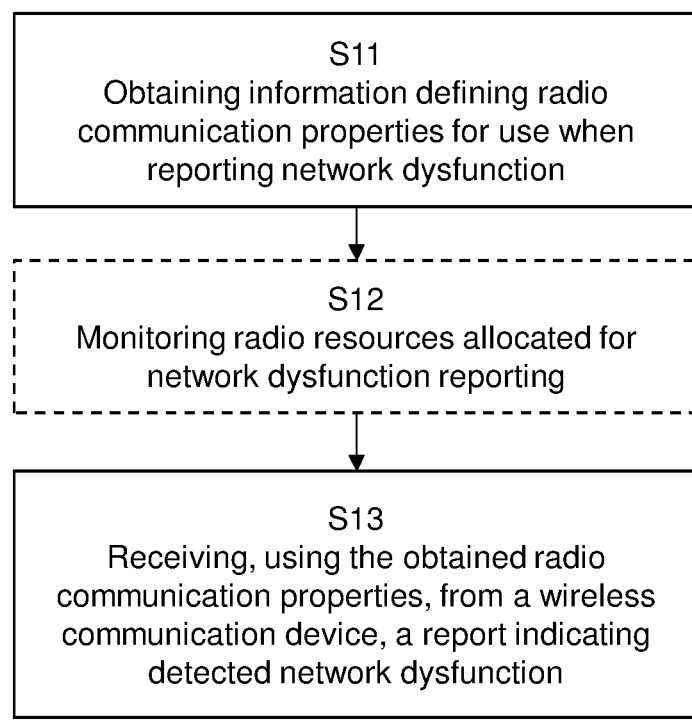
FIG. 7 is a flow chart illustrating example operations in a radio network node.

The corresponding method, for use in a radio network node 20, for receiving network dysfunction reporting will now be described with reference to FIG. 7. The method of FIG. 7 is e.g. performed by a control arrangement 21 (FIG. 10) of the radio network node 20. The method may be implemented as a computer program comprising instructions which, when the program is executed by a computer (e.g. a processor in the control arrangement 21), cause the computer to carry out the method. According to some embodiments the computer program is stored in a computer-readable medium (e.g. a memory or a compact disc) that comprises instructions which, when executed by a computer, cause the computer to carry out the method.

The method comprises obtaining S11 information defining radio communication properties for use when reporting network dysfunction in the communication network 1. This step is already explained in connection with step S1 above. Typically, the radio communication properties for use when reporting network dysfunction are different from the properties used for other communication, i.e. ordinary communication in the network 1. Ordinary communication is communication performed under normal (i.e. not dysfunctional) network conditions, for example communication associated with activities performed by a user, such as voice calls, SMS, data traffic (e.g. user applications) etc.

In some embodiments, the radio communication properties comprise at least one of; transmission power, radio resources, Radio Access Technology, RAT, communication protocol, cell identity, tracking area code, ciphering methodology, and use of direct communication with a further communication device.

In specific implementations of this function the network may allow the UE to use non-3GPP access solutions for the jamming alert in case such solution happens to be available and not impacted by the network failure causing the alert. Such access could be a Bluetooth, Wi-Fi or similar type of communication, or even a non-wireless link.

In some embodiments, the obtaining S11 comprises obtaining information about radio resources allocated for reporting network dysfunction and wherein the method further comprises. Then the method further comprises monitoring S12 the radio resources allocated for network dysfunction reporting. In some embodiments, multiple predetermined resources are added with priority and with potential pre-conditions per resource. A priority among different alternative resources can be made. For example, the network could have provided a wireless communication device 10 with a first set of resources to use and combined those resources with a pre-condition. Such precondition could be indicative of a geographic area. In case the wireless communication device 10 can determine its position in relation to the geographic area and the first set of resources are allowed in that area, the wireless communication device 10 can use the first set of resources. Further a second set of resources could have been provided by the network with or without a second set of preconditions. The wireless communication device 10 will use the highest prioritized resources depending on whether there are any preconditions and whether those preconditions are met.

The method comprises receiving S13 using the obtained radio communication properties, from a wireless communication device 10, 30, a report indicating detected network dysfunction. In some embodiments, the receiving S13 comprises receiving the report from a wireless communication device 30 different from the wireless communication device 10 that detected the network dysfunction. The radio network node 20 receiving the report may be directly or indirectly connected to e.g. law enforcement agency, operator or regulator. The potential further use of the information is not specifically covered herein, but it is expected that one target is to quickly identify and remove any interfering object from the wireless communication network 1 and another target is to use the information for services that the wireless communication device 10 provides (e.g. if an emergency button or a theft prevention tracker is jammed, it is cause for action in that system). Note that the receiving system may be a generic system, independent of the specific utilized radio access network. It may use a common set of resources, which could be shared by two or more mobile operators in the same region.

Figure 8:
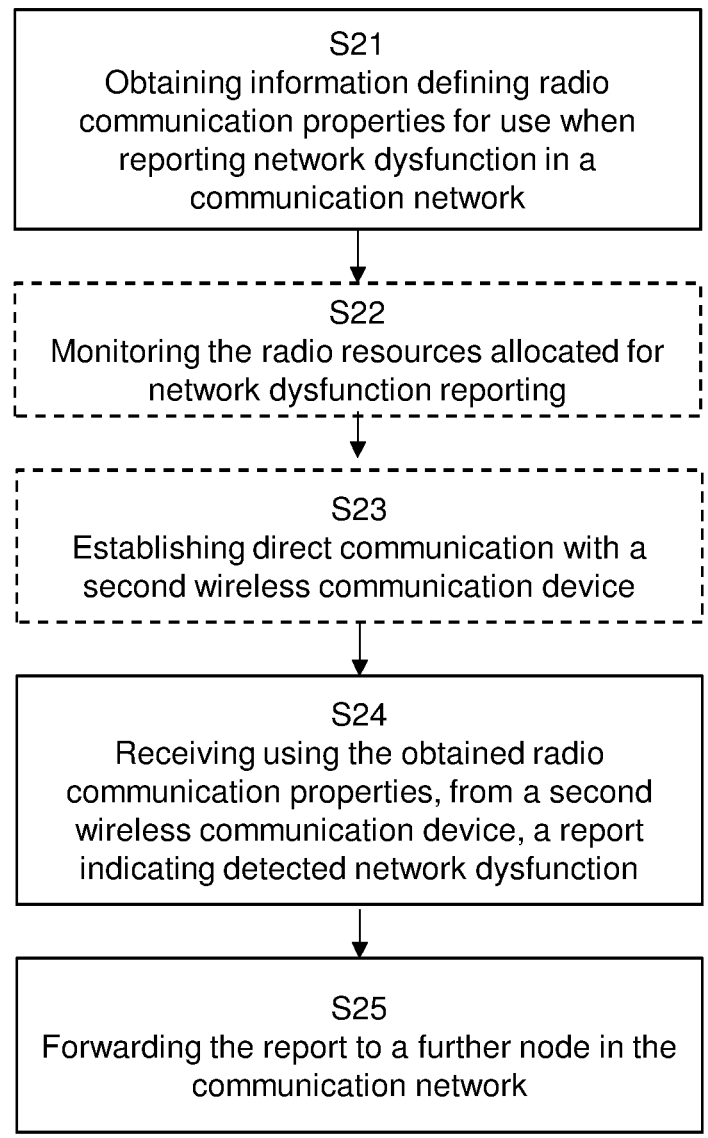
FIG. 8 is a flow chart illustrating example operations in a wireless communication device that assists in reporting network dysfunction.

The corresponding method, for use in a first wireless communication device 30 (i.e. a wireless communication device that assists in reporting network dysfunction), for assisting the wireless communication device 10 (in this example referred to as the second wireless communication device 10) in reporting network dysfunction in a communication network 1, will now be described with reference to FIG. 8. The method of FIG. 8 is e.g. performed by a control arrangement 31 (FIG. 11) of the first wireless communication device 30. The method may be implemented as a computer program comprising instructions which, when the program is executed by a computer (e.g. a processor in the control arrangement 31), cause the computer to carry out the method. According to some embodiments the computer program is stored in a computer-readable medium (e.g. a memory or a compact disc) that comprises instructions which, when executed by a computer, cause the computer to carry out the method.

The method comprises obtaining S21 information defining radio communication properties for use when reporting network dysfunction in the communication network 1. For example, the wireless network 1 may configure wireless communication devices to periodically listen for alert transmissions (as described above), on direct communication resources allocated to such usage. Any wireless communication device capable of direct communication could be considered as a candidate for such network-based configuration. However, it would be likely that in practice certain types of wireless devise are more suitable than others for such activation e.g. wireless communication devices that are using a certain Quality of Service class or have registered to certain ProSe services or similar.

In some embodiments, the obtaining S21 comprises obtaining information about radio resources allocated for reporting network dysfunction and then the method further comprises monitoring S22 the radio resources allocated for network dysfunction reporting. This corresponds to the procedure described in connection with step S1 above.

The method further comprises receiving S24 using the obtained radio communication properties, from the second wireless communication device 10, a report indicating detected network dysfunction. In case a UE gets this alert message about network dysfunction the wireless communication device 30 itself can actively perform a scan to detect if the network dysfunction indicated by the alert is valid for the wireless communication device itself 30, e.g. if a jammer is visible also for the first wireless communication device 30. If the first wireless communication device 30 can reach the network it can directly report about the condition of the first wireless communication device 10 to the radio network node 20. In case the first wireless communication device 10 is also jammed it makes same measurement as the second wireless communication device 20 and broadcasts it with the same protocol as the second wireless communication device 20 with the additional information measured from the first wireless communication device 20. In other words, the method comprises forwarding S25 the report to a further node 20, 40 in the communication network 1. The further node is either a radio network node 20 and/or a further wireless communication device 40.

In some embodiments, the method comprises establishing S23 direct communication with the second wireless communication device 10, and the receiving S24 comprises receiving the report using the established direct communication. However, the report may also be a broadcasted message as described above.

In one example implementation a wireless communication device 30 that forwards an alert message in an out of coverage situation, uses the same alert ID as the received alert message, and includes an own wireless communication device ID in addition to the existing wireless communication device ID list, and before forwarding increase the hop counter. A wireless communication device is typically not expected to forward an alert with a unique alert ID more than once for a network configured predetermined period of time, and the wireless communication device is typically not expected to forward an alert having a hop counter larger than a network configured predetermined number.

By relaying the jamming information to all wireless communication devices in close proximity and perform measurements in the "newly informed" devices, more valuable information is collected about the network dysfunction. Once the alert message reaches the network all possible information about the network dysfunction is collected. This would also allow for the network to find the root cause of the network dysfunction (e.g. a jammer) with very low detection latency "close to real time", since the alert message is relayed until it reaches a wireless communication device that is outside the disturbed area and can therefore reach the network.

The disclosure also relates to a wireless communication device 10 configured to implement the method for use in a communications device 10 (FIG. 6). The wireless communications device 10 may comprise the modules depicted in FIG. 9 for reporting network dysfunction. Those skilled in the art will appreciate that the different modules described below may also be referred to as e.g. units or the like.

The wireless communications device 10 may comprise a transmitter 11a and a receiver 11b for wireless signals.

The wireless communications device 10 is configured to, e.g. by means of an obtaining module 121, obtain information defining radio communication properties for use when reporting network dysfunction in a wireless communication network 1. The obtaining module 121 may be implemented by the processor 12 of the wireless communications device 10.

The wireless communications device 10 is configured to, e.g. by means of a detecting module 122, detect network dysfunction. The detecting module 122 may be implemented by the processor 12 and/or the transmitter 11a of the wireless communications device 10.

The wireless communications device 10 may further be configured to, e.g. by means of an establishing module 123, establish direct communication with a further wireless communication device 30. The establishing module 123 may be implemented by the processor 12 and/or the receiver 11*b* of the wireless communications device 10.

The wireless communications device 10 is further configured to, e.g. by means of a sending module 124, send a report indicating the detected network dysfunction using the obtained radio communication properties. The sending module 124 may be implemented by the processor 12 and/or the transmitter 11*a* of the wireless communications device 10.

In general, the wireless communications device 10 may be configured to perform all aspects of the method for use in a wireless communication device 10 described in FIG. 6.

The disclosure also relates to a radio network node 20 configured to implement the method for use in a radio network node 20 (FIG. 7). The radio network node 20 may comprise the modules depicted in FIG. 10 for receiving reporting of network dysfunction.

The radio network node 20 may comprise a transmitter 21*a* and a receiver 21*b* for wireless signals.

The radio network node 20 is configured to, e.g. by means of an obtaining module 221, obtain information defining radio communication properties for use when reporting network dysfunction in the wireless communication network 1. The obtaining module 220 may be implemented by a processor 22 and/or the receiver 21*b* of the radio network node 20.

The radio network node 20 may be configured to, e.g. by means of a monitoring module 222, monitor radio resources allocated for network dysfunction reporting. The monitoring module 222 may be implemented by a processor 22 and/or the receiver 21*b* of the radio network node 20.

The radio network node 20 is configured to, e.g. by means of an receiving module 223, receive, using the obtained radio communication properties, from a wireless communication device 10, 30, a report indicating detected network dysfunction. The receiving module 223 may be implemented by a processor 22 and/or the receiver 21*b* of the radio network node 20.

In general, the radio network node 20 may be configured to perform all aspects of the method for use in a radio network node 20 described in FIG. 7.

The disclosure also relates to a first wireless communication device 30 configured to implement the method for use in a first communications device 30 (FIG. 8). The first wireless communications device 30 may comprise the modules depicted in FIG. 11 for assisting a second wireless communication device 10 in reporting network dysfunction.

Those skilled in the art will appreciate that the different modules described below may also be referred to as e.g. units or the like.

The first wireless communications device 30 may comprise a transmitter 31*a* and a receiver 31*b* for wireless signals.

The first wireless communications device 30 is configured to, e.g. by means of an obtaining module 321, obtain information defining radio communication properties for use when reporting network dysfunction in a wireless communication network 1. The obtaining module 321 may be implemented by the processor 32 of the first wireless communications device 30.

The first wireless communications device 30 may further be configured to, e.g. by means of a monitoring module 322, monitor the radio resources allocated for network dysfunction reporting. The monitoring module 322 may be implemented by the processor 32 and/or the transmitter 31*a* of the first wireless communications device 30.

The first wireless communications device 30 may further be configured to, e.g. by means of an establishing module 323, establish direct communication with a further wireless communication device 30. The establishing module 323 may be implemented by the processor 32 and/or the receiver 31*b* of the first wireless communications device 30.

The first wireless communications device 30 may further be configured to, e.g. by means of a receiving module 324, receive using the obtained radio communication properties, from the second wireless communication device 10, a report indicating detected network dysfunction. The receiving module 324 may be implemented by the processor 32 and/or the transmitter 31*a* of the first wireless communications device 30.

The first wireless communications device 30 may further be configured to, e.g. by means of a forwarding module 325, forward the report to a further node 20, 40 in the wireless communication network 1. The forwarding module 325 may be implemented by the processor 32 and/or the transmitter 31*a* of the first wireless communications device 30.

In general, the first wireless communications device 30 may be configured to perform all aspects of the method for use in a first wireless communication device 30 described in FIG. 8.

Some embodiments herein may also be described as a system comprising the wireless communications device 10, the serving radio network node 20 and one or more first wireless communications devices 30.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, or one or more of the blocks may be skipped, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Figure 9:
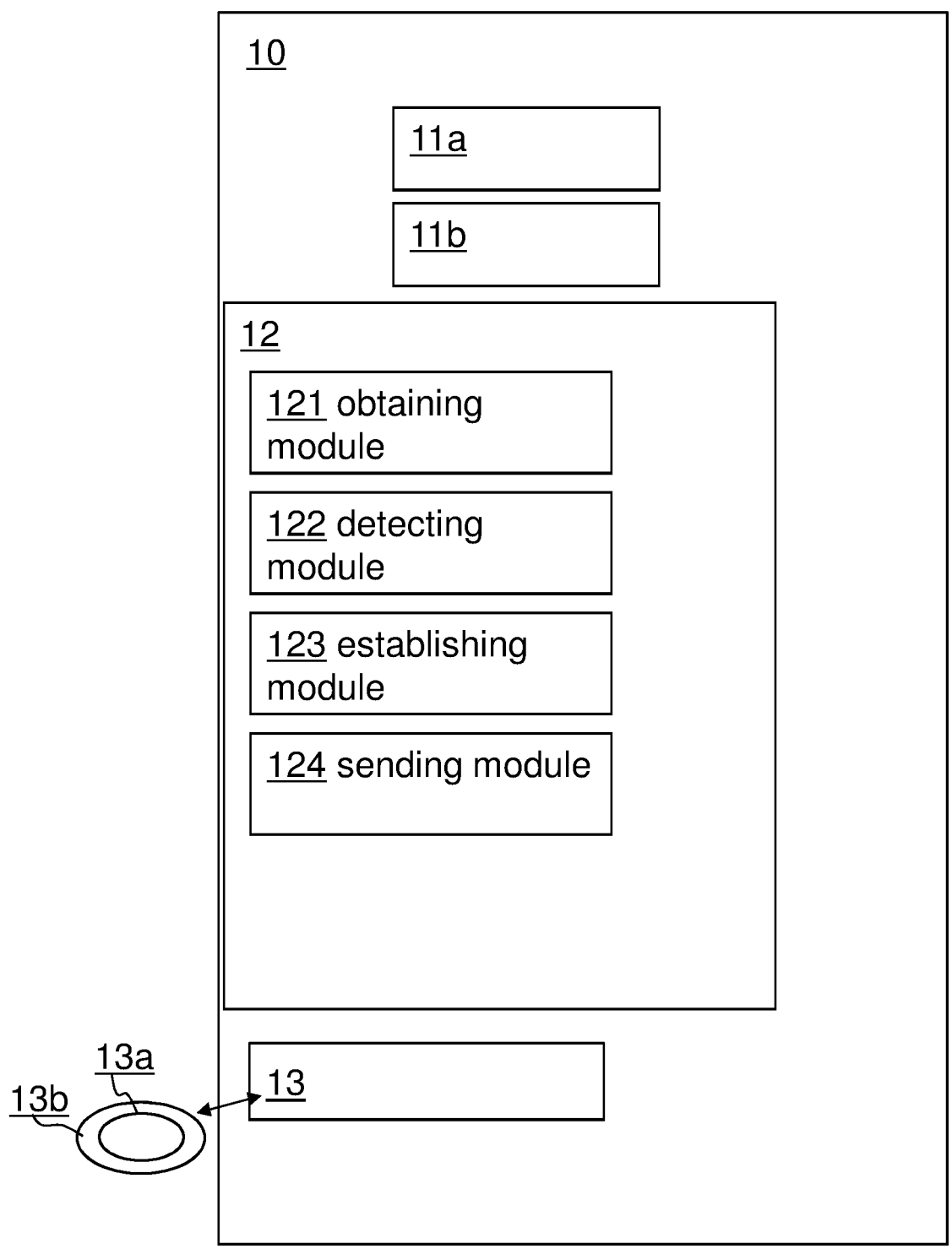
FIG. 9 illustrates an example wireless communication device.
Figure 10:
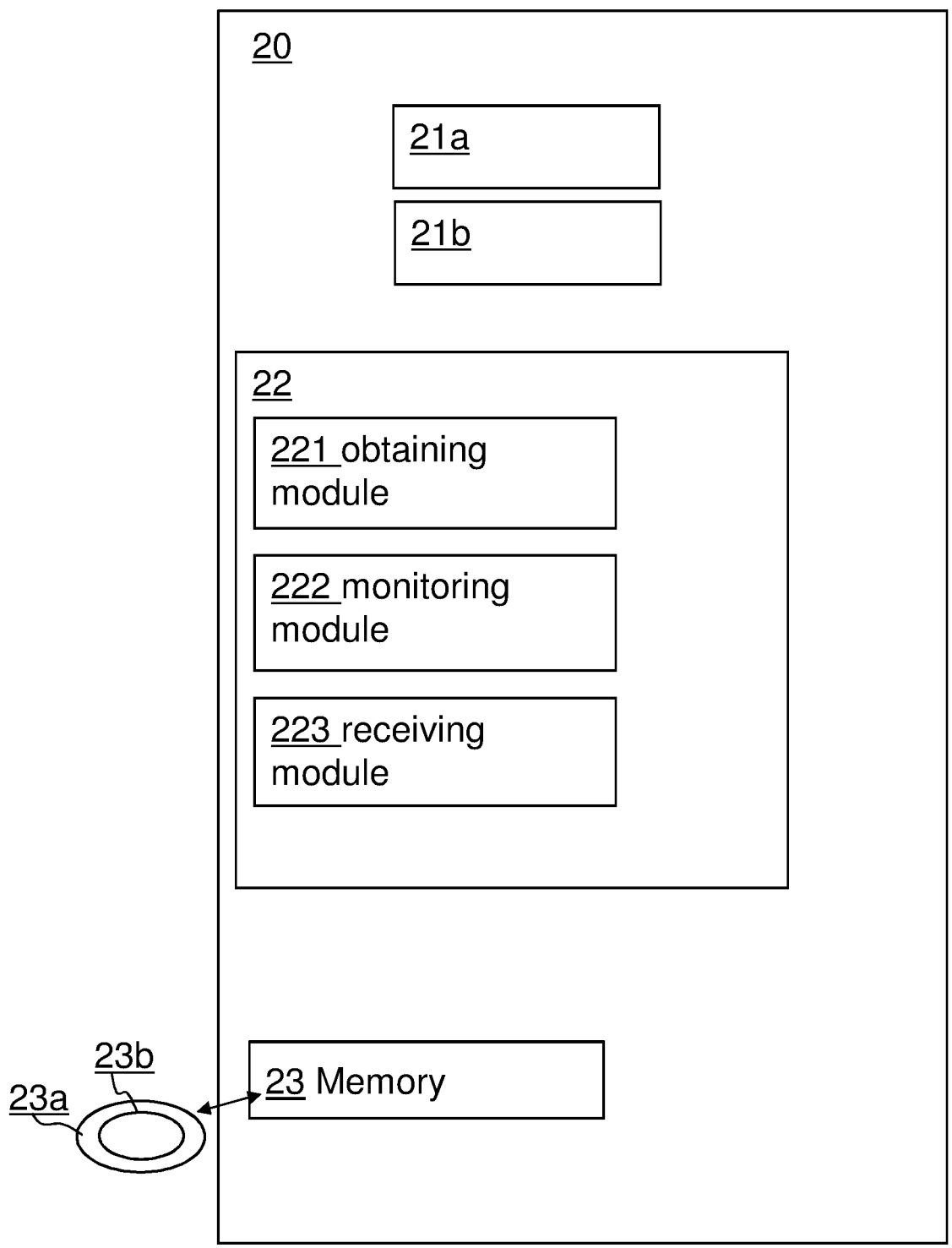
FIG. 10 illustrates an example radio network node.
Figure 11:
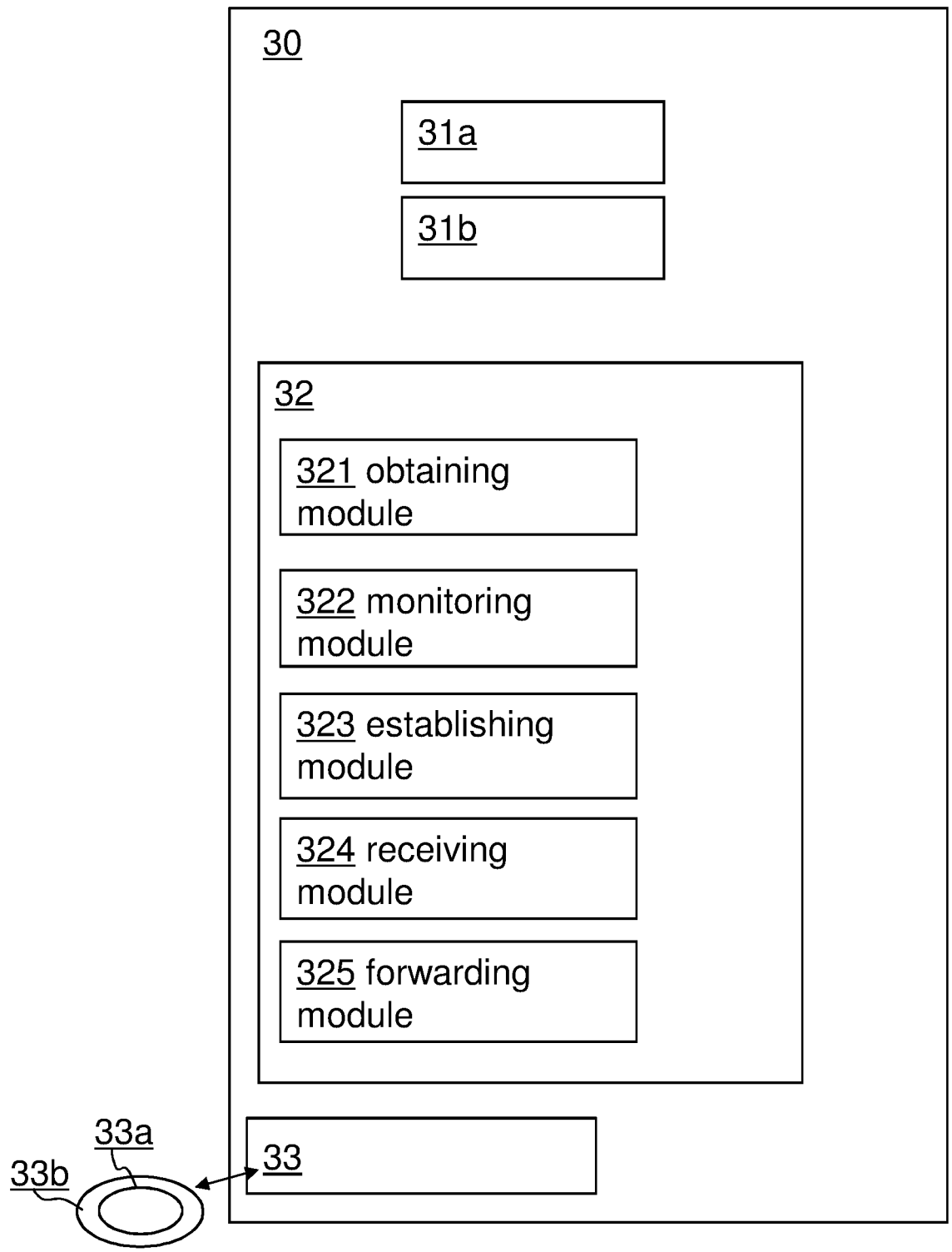
FIG. 11 illustrates an example wireless communication device that assists in reporting network dysfunction.

The embodiments herein may be implemented through one or more processors, such as the processor 12, 32 in the wireless communications devices 10, 30 depicted in FIGS. 9 and 11, and the processor 22 in the radio network node 20 depicted in FIG. 10 together with computer program code for performing the functions and actions of the embodiments herein. The program code mentioned above may also be provided as a computer program product 131, 231, 331, for instance in the form of a data carrier 132, 232, 332 carrying computer program code for performing the embodiments herein when being loaded into the radio network node 20 and the wireless communications devices 10, 30.

One such carrier may be in the form of a CD ROM disc. It is however feasible with other data carriers such as a memory stick. The computer program code may furthermore be provided as pure program code on a server and downloaded via a fixed or wireless communication link to the radio network node 20 and the wireless communications devices 10, 30.

Thus, the methods according to the embodiments described herein for the radio network node 20 and the wireless communications device 10, 30 may be implemented by means of a computer program product, comprising instructions, i.e., software code portions, which, when executed on at least one processor, cause the at least one processor to carry out the actions described herein, as performed by the radio network node 20 and the wireless communications devices 10, 30. The computer program product may be stored on a computer-readable storage medium. The computer-readable storage medium, having stored there on the computer program, may comprise the instructions which, when executed on at least one processor, cause the at least one processor to carry out the actions described herein, as performed by the radio network node 20 and the wireless communications devices 10, 30. In some embodiments, the computer-readable storage medium may be a non-transitory computer-readable storage medium.

The wireless communications devices 10, 30 and the radio network node 20 may further each comprise a memory 13, 23, 33 comprising one or more memory units. The memory 13, 23, 33 is arranged to be used to store obtained information, such as predetermined rules and criteria for activating the discovery signal, and to perform the methods herein when being executed in the radio network node 20 and the wireless communications devices 10, 30.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A method performed by a wireless communication device, for reporting network dysfunction in a cell served by a radio network node of a wireless communication network, the method comprising:
    obtaining information defining radio communication properties comprising radio resources allocated for use when reporting network dysfunction in said cell of the wireless communication network,
    detecting network dysfunction based on detecting interference exceeding a level indicating an intentional disturbance in said cell of the wireless communication network, and
    sending a report for receipt in said network node, indicating the detected network dysfunction, using the obtained radio communication properties by broadcasting the report on the allocated radio resources.

2. The method according to claim 1, wherein the radio communication properties for use when reporting network dysfunction are different from the properties used for regular communication in the wireless communication network.

3. The method according to claim 1, wherein the radio communication properties for use when reporting network dysfunction comprises at least one of; transmission power, radio resources, Radio Access Technology (RAT), communication protocol, cell identity, tracking area code, ciphering methodology and use of direct communication with a further wireless communication device.

4. The method according to claim 1, further comprising:
    establishing direct communication with a second wireless communication device and
    wherein the sending comprises sending the report with the second wireless communication device using the established direct communication between the wireless communication device and the second wireless communication device.

5. The method according to claim 1, wherein the network dysfunction comprises interference from jammers and/or fraudulent base stations.

6. A method performed by a radio network node in a wireless communication network, for receiving network dysfunction reporting in a cell served by the radio network node, the method comprising:
    obtaining information defining radio communication properties comprising radio resources allocated for use when reporting network dysfunction in said cell, and
    receiving, using the obtained radio communication properties, a report broadcasted from a wireless communication device on the allocated radio resources, wherein said report indicates detected network dysfunction based on detecting, in the wireless communication device, interference exceeding a level indicating an intentional disturbance.

7. The method according to claim 6, wherein the radio communication properties for use when reporting network dysfunction are different from the properties used for regular communication in the wireless communication network.

8. The method according to claim 6, wherein the radio communication properties comprise at least one of; transmission power, radio resources, Radio Access Technology (RAT), communication protocol, cell identity, tracking area code, ciphering methodology and use of direct communication with a further communication device.

9. The method according to claim 6, further comprising:
monitoring the radio resources allocated for network dysfunction reporting.

10. The method according to claim 6, wherein the receiving comprises receiving the report from a wireless communication device different from the wireless communication device that detected the network dysfunction.

11. The method according to claim 6, wherein the network dysfunction comprise interference from jammers and/or fraudulent base stations.

12. A method performed by a first wireless communication device, for assisting a second wireless communication device in reporting network dysfunction in a cell served by a radio network node of a wireless communication network, the method comprising:
obtaining information defining radio communication properties comprising radio resources allocated for use when reporting network dysfunction in said cell of the wireless communication network,
receiving using the obtained radio communication properties, from the second wireless communication device, a report broadcast on the allocated radio indicating detected network dysfunction based on detecting, in the second wireless communication device, interference exceeding a level indicating an intentional disturbance, and
forwarding the report to said radio network node in the wireless communication network.

13. The method according to claim 12, further comprising:
monitoring the radio resources allocated for network dysfunction reporting.

14. The method according to claim 12, further comprising:
establishing direct communication with the second wireless communication device, and
wherein the receiving comprises receiving the report from the first wireless communication device using the established direct communication between the first wireless communication device and the second wireless communication device.

15. The method according to claim 12, wherein the further node is a radio network node and/or a further wireless communication device.

16. The method of claim 4, wherein the direct communication is a side-link communication.

17. The method of claim 14, wherein the direct communication is a side-link communication.

* * * * *